United States Patent
Tang

(10) Patent No.: US 8,761,985 B2
(45) Date of Patent: *Jun. 24, 2014

(54) METHOD OF OPERATING A DUAL MOTOR DRIVE AND CONTROL SYSTEM FOR AN ELECTRIC VEHICLE

(71) Applicant: Tesla Motors, Inc., Palo Alto, CA (US)

(72) Inventor: Yifan Tang, Los Altos, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/866,214

(22) Filed: Apr. 19, 2013

(65) Prior Publication Data

US 2013/0241445 A1    Sep. 19, 2013

Related U.S. Application Data

(60) Division of application No. 12/782,413, filed on May 18, 2010, now Pat. No. 8,453,770, which is a continuation-in-part of application No. 12/322,218, filed on Jan. 29, 2009, now abandoned, and a continuation-in-part of application No. 12/380,427, filed on Feb. 26, 2009, now Pat. No. 7,739,005.

(51) Int. Cl.
*B60L 11/00* (2006.01)
*G06F 17/00* (2006.01)

(52) U.S. Cl.
USPC .............................. 701/22; 701/82; 180/65.1

(58) Field of Classification Search
None
See application file for complete search history.

(56) References Cited

U.S. PATENT DOCUMENTS

| | | |
|---|---|---|
| 4,589,511 A | 5/1986 | Leiber |
| 5,148,883 A | 9/1992 | Tanaka et al. |
| 5,419,624 A | 5/1995 | Adler et al. |
| 5,465,806 A | 11/1995 | Higasa et al. |
| 5,508,924 A | 4/1996 | Yamashita |
| 5,549,172 A | 8/1996 | Mutoh et al. |
| 5,804,935 A | 9/1998 | Radev |
| 6,909,959 B2 | 6/2005 | Hallowell |
| 7,033,406 B2 | 4/2006 | Weir et al. |
| 2002/0147539 A1 | 10/2002 | Strothmann |
| 2004/0104699 A1 | 6/2004 | Nishikawa et al. |
| 2004/0222771 A1 | 11/2004 | Iwata et al. |
| 2006/0016630 A1 | 1/2006 | Yang |
| 2006/0185915 A1 | 8/2006 | Kaneko |
| 2007/0038340 A1 | 2/2007 | Sekiguchi et al. |
| 2007/0284159 A1 | 12/2007 | Takami et al. |
| 2008/0032162 A1 | 2/2008 | Hirakata |
| 2008/0251246 A1 | 10/2008 | Ohkuma et al. |
| 2008/0276825 A1 | 11/2008 | King et al. |
| 2010/0194318 A1 | 8/2010 | Aso |

FOREIGN PATENT DOCUMENTS

JP    2009-092805 A    3/2003

*Primary Examiner* — Michael J Zanelli
(74) *Attorney, Agent, or Firm* — J. Richard Soderberg

(57) ABSTRACT

A method for optimizing the torque applied by each motor of a dual motor drive system of an all-electric vehicle is provided, the torque adjustments taking into account wheel slip as well as other vehicular operating conditions.

15 Claims, 12 Drawing Sheets

METHOD OF OPERATING A DUAL MOTOR DRIVE AND CONTROL SYSTEM FOR AN ELECTRIC VEHICLE

CROSS-REFERENCES TO RELATED APPLICATIONS

This application is a divisional of U.S. patent application Ser. No. 12/782,413, filed 18 May 18, 2009, which is a continuation-in-part of U.S. patent application Ser. No. 12/322,218, filed 29 Jan. 2009, and a continuation-in-part of U.S. patent application Ser. No. 12/380,427, now U.S. Pat. No. 7,739,005, the disclosures of which are incorporated herein by reference for any and all purposes.

FIELD OF THE INVENTION

The present invention relates generally to electric vehicles and, more particularly, to a dual electric motor drive system and corresponding control system.

BACKGROUND OF THE INVENTION

The trend towards designing and building fuel efficient, low emission vehicles has increased dramatically over the last decade, this trend driven by concerns over the environment as well as increasing fuel costs. At the forefront of this trend has been the development of hybrid vehicles, vehicles that combine a relatively efficient combustion engine with an electric drive motor.

Currently, most common hybrids utilize a parallel drive system, although the implementation of the parallel drive system can vary markedly between different car manufacturers. In one form, illustrated in FIG. 1, power to wheels 101 is via planetary gears 103 and transaxle 105, the power coming from either, or both, combustion engine 107 and electric motor 109. A power splitter 111 splits the power from combustion engine 107 between generator 113 and the drive system, i.e., gears 103, axle 105 and wheels 101, the power split designed to maximize efficiency based on vehicle needs. The electric power generated by generator 113, after passing through an inverter 115, is used to either provide electricity to drive motor 109 or battery 117.

In hybrid system 100, motor 109 is the primary source of propulsion when the engine is relatively inefficient, for example during initial acceleration, when stationary, under deceleration or at low cruising speeds. Combustion engine 107 assists motor 109 in supplying propulsion power when demands on the vehicle are higher than what can be met by motor 109, for example during medium-to-hard acceleration, medium-to-high cruising speeds or when additional torque is required (e.g., hill climbing).

FIG. 2 illustrates the basic elements of another type of parallel drive system, often referred to as an integrated motor assist, or IMA, system. IMA system 200 utilizes a single electric motor 201 that is positioned between the combustion engine 203 and the drive system's transmission 205, transmission 205 coupling power through axle 207 to wheels 209. In this system motor 201 serves dual roles; first, as a drive motor and second, as a generator. In its capacity as a generator, motor 201 is coupled to battery pack 211 via inverter 213.

In hybrid system 200, engine 203 is the primary source of propulsion while motor 201 provides assistance during acceleration and cruising. During deceleration, motor 201 recaptures lost energy using a regenerative braking scheme, storing that energy in battery pack 211. As a result of this approach, a smaller and more fuel-efficient engine can be used without a significant lose in performance since motor 201 is able provide power assistance when needed.

Although in general hybrids provide improved fuel efficiency and lower emissions over those achievable by a non-hybrid vehicle, such cars typically have very complex and expensive drive systems due to the use of two different drive technologies. Additionally, as hybrids still rely on an internal combustion engine for a portion of their power, the inherent limitations of the engine prevent such vehicles from achieving the levels of pollution emission control and fuel efficiency desired by many. Accordingly several car manufacturers, including Tesla Motors, are studying and/or utilizing an all-electric drive system.

FIG. 3 illustrates the basic components associated with one configuration of an all-electric vehicle. As shown, EV 300 couples an electric motor 301 to axle 303 and wheels 305 via transmission/differential 307. A power control module 309 couples motor 301 to battery pack 311.

FIGS. 4 and 5 graphically illustrate some of the performance differences between a vehicle using a combustion engine as the sole propulsion source, one using hybrid technology, and one using only a single electric motor. In the torque curves shown in FIG. 4, curve 401 illustrates the narrow region over which a typical combustion engine provides torque, and thus the reason why multiple gears are required to utilize such an engine efficiently. Curve 501 in FIG. 5 is the corresponding power curve for the combustion engine. In a hybrid configuration, the output from a combustion engine is combined with an electric motor, thus combining the low speed torque provided by the electric assist motor (curve 403) with that of the combustion engine (curve 401) to provide a dramatic improvement in low speed torque. Curves 405 and 503 illustrate the torque and power, respectively, of such a combination. Curves 407 and 505 illustrate the benefits of a high output power, all electric drive system, specifically showing both the low speed torque/power that such a system provides as well as the wide speed range over which such torque/power is available.

Although significant advancements have been made in the area of fuel efficient, low emission vehicles, further improvements are needed. For example, hybrid vehicles still rely on combustion engines for a portion of their power, thus not providing the desired levels of fuel independence and emission control. Current all-electric vehicles, although avoiding the pitfalls associated with combustion engines, may not have the range, power or level of traction control desired by many. Accordingly, what is needed is an improved all-electric vehicle drive system. The present invention provides such a system.

SUMMARY OF THE INVENTION

The present invention provides a method for optimizing the torque applied by each motor of a dual motor drive system of an all-electric vehicle.

In at least one embodiment of the invention, a method of operating an electric vehicle traction is disclosed, the method comprising the steps of computing vehicle speed, computing a total torque requirement request, splitting the total torque requirement request into optimal first and second motor torque requests, monitoring a wheel speed sensor and computing a wheel slip error, minimizing the wheel slip error and transforming the optimal first and second motor torque requests into first and second motor torque commands, and controlling the first and second electric motors of the electric vehicle based on the first and second motor torque commands. The disclosed method may further comprise one or more monitoring steps, including; monitoring first and second motor speed sensors, monitoring a steering sensor, monitoring a brake sensor, monitoring an accelerator sensor, monitoring first and second power control module temperature sensors, monitoring energy storage system (ESS) temperature sensors, monitoring ESS voltage sensors, and monitoring ESS current sensors. The disclosed method may further comprise the steps of computing first and second motor maximum available torque and limiting the optimal first and second motor torque requests by the first and second motor maximum available torque and/or limiting the first and second motor torque commands by the first and second motor maximum available torque. The disclosed method may further comprise the step of computing optimal first and second motor flux commands.

A further understanding of the nature and advantages of the present invention may be realized by reference to the remaining portions of the specification and the drawings.

DESCRIPTION OF THE SPECIFIC EMBODIMENTS

In the following text, the terms "electric vehicle" and "EV" may be used interchangeably and refer to an all-electric vehicle. Similarly, the terms "hybrid", "hybrid electric vehicle" and "HEV" may be used interchangeably and refer to a vehicle that uses dual propulsion systems, one of which is an electric motor and the other of which is a combustion engine. Similarly, the terms "battery", "cell", and "battery cell" may be used interchangeably and refer to any of a variety of different rechargeable cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and current capacity for a particular application. The terms "energy storage system" and "ESS" may be used interchangeably and refer to an electrical energy storage system that has the capability to be charged and discharged such as a battery, battery pack, capacitor or supercapacitor. Lastly, identical element symbols used on multiple figures refer to the same component, or components of equal functionality. Additionally, the accompanying figures are only meant to illustrate, not limit, the scope of the invention.

Figure 1:
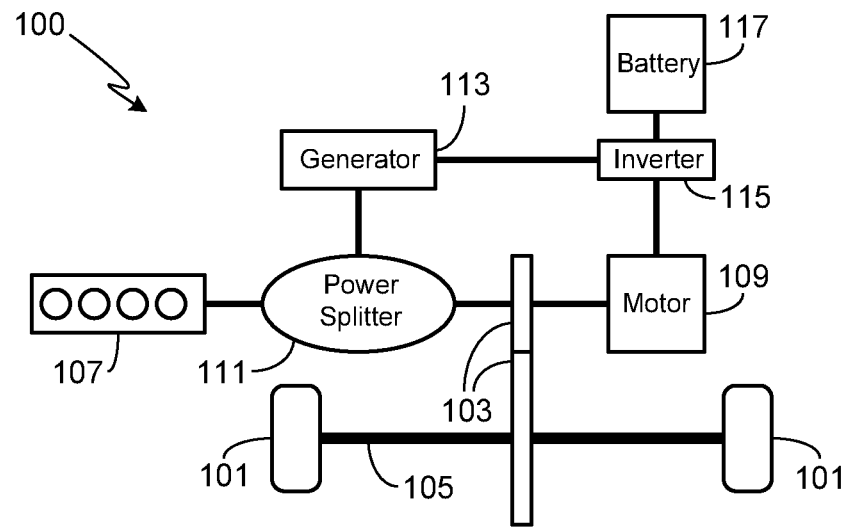
FIG. 1 illustrates a parallel drive system according to the prior art.
Figure 2:
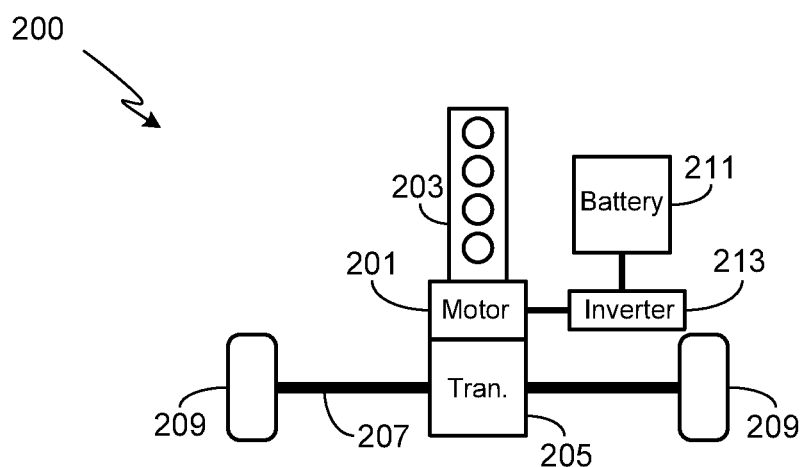
FIG. 2 illustrates a parallel drive system based on an IMA configuration according to the prior art.
Figure 3:
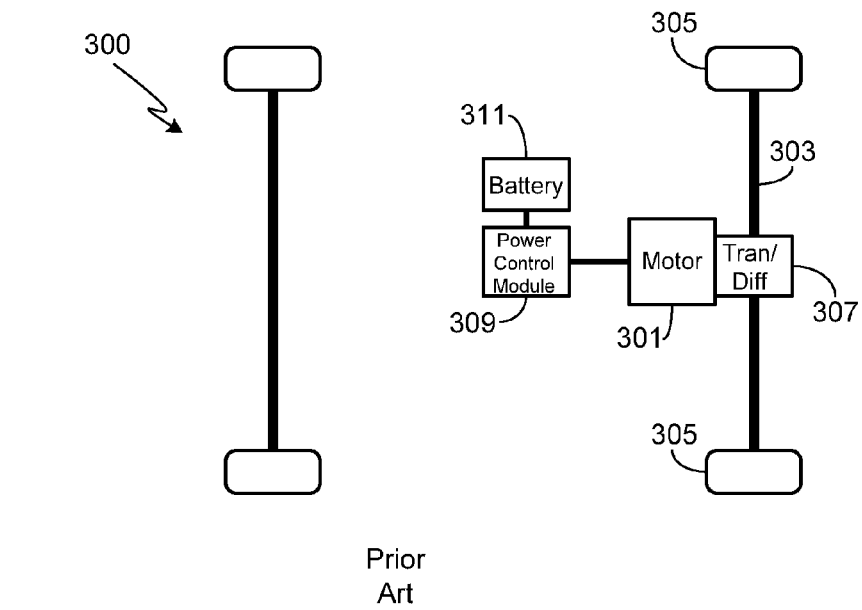
FIG. 3 illustrates an all-electric drive system according to the prior art.
Figure 4:
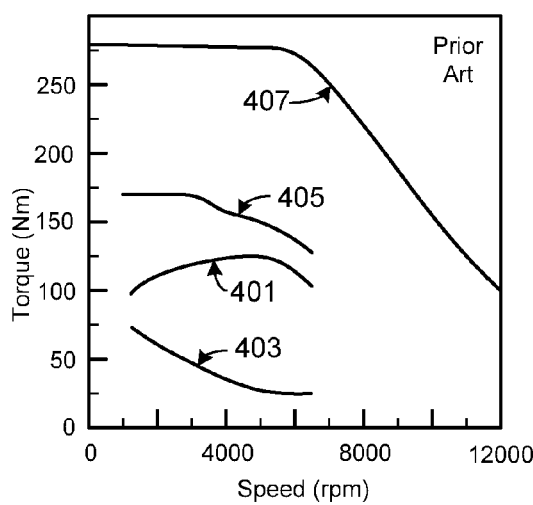
FIG. 4 graphically illustrates the torque curves for a combustion engine, a hybrid configuration and an all-electric drive system according to the prior art.
Figure 5:
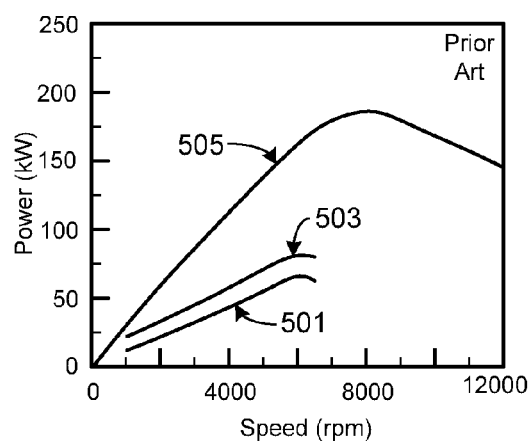
FIG. 5 graphically illustrates the power curves for a combustion engine, a hybrid configuration and an all-electric drive system according to the prior art.
Figure 6:
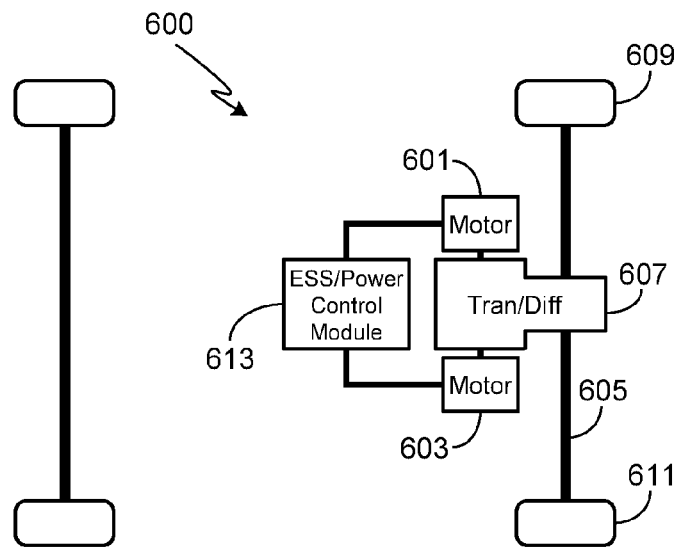
FIG. 6 illustrates the basic elements of a dual electric motor drive system in accordance with the invention.

FIG. 6 illustrates the basic elements of a dual electric motor drive system 600 in accordance with the invention. As shown, power from electric motors 601 and 603 is sent to axle 605 via transmission/differential assembly 607. In this configuration, although there are two motors 601/603 coupled to axle 605, there is a single axle speed, i.e., system 600 is not configured to allow independent drive speeds at wheels 609 and 611. Motors 601 and 603 may operate at the same speed, or different speeds, depending upon how each motor is coupled to axle 605 via transmission/differential assembly 607. Note that as with a conventional vehicle, power may be coupled to one or both wheels via axle 605. For purposes of this simplified illustration, a single ESS/power control module 613 is shown coupled to both motors 601/603, however, as described in detail below, the inventor envisions powering and controlling these two motors in a variety of ways and module 613 is only meant to represent, not limit, such means. In the preferred embodiment of the invention, and as described in more detail below, preferably the operating characteristics of motors 601 and 603 are different, thus allowing the overall drive train performance to be optimized.

Figure 7:
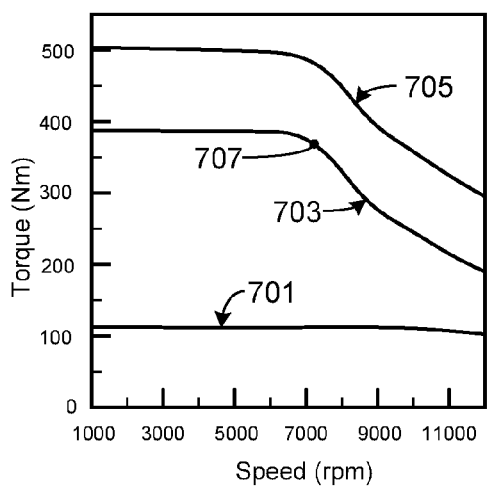
FIG. 7 graphically illustrates the torque curves for a preferred dual motor configuration.
Figure 8:
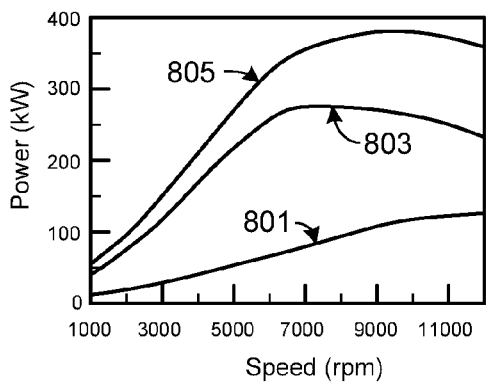
FIG. 8 graphically illustrates the power curves for a preferred dual motor configuration.

In a preferred embodiment of the invention, both motors 601 and 603 are AC induction motors. While the operating characteristics of the two motors are selected on the basis of the desired drive train performance, in the exemplary and preferred embodiment illustrated in FIGS. 7 and 8, one of the motors (e.g., motor 601) is designed to have a relatively flat torque curve over a wide range of speeds such that it may be used to augment the output of the second motor (e.g., motor 603) at high speeds, specifically in the range in which the torque of second motor 603 is dropping off. FIGS. 7 and 8 illustrate torque and power curves, respectively, of motors 601 and 603 in such a configuration. In particular, curves 701 and 801 represent the torque and power curves, respectively, of motor 601 in this configuration while curves 703 and 803 represent the torque and power curves, respectively, of motor 603. Curves 705 and 805 represent the torque and power curves, respectively, of the combination of motors 601 and 603.

It will be appreciated that there are numerous ways of coupling motors 601 and 603 to axle 605 and as such, motors 601 and 603 may or may not rotate at the same rate for a given axle speed. For example, in one embodiment, one of the motors is coupled via the sun gear of transmission/differential assembly 607 while the other motor is coupled via the ring gear.

FIGS. 7 and 8 illustrate that in at least one preferred embodiment, the maximum amount of torque from one of the motors (e.g., motor 601) is substantially constant throughout the range of motor speeds, and as a result the maximum amount of assist power increases as a function of motor speed (FIG. 8). This preferred embodiment applies to both the motoring and regenerating modes of operation. One benefit of this approach is that it can be used to compensate for torque fall-off at higher speeds, a characteristic typical of electric motors with limited operating voltage. Another benefit of significantly increasing the high speed capabilities of a vehicle in accordance with the preferred embodiment of the invention is improved vehicle performance, specifically in the areas of top speed, high speed acceleration, and hill climbing abilities. Lastly, utilizing the dual motor approach of the present invention, in some configurations it is possible to achieve a lower total motor weight than a single motor sized to provide similar capabilities.

As previously noted, the curves shown in FIGS. 7 and 8 assume the use of AC inductions motors even though this is not a requirement of the invention. Curve 703 illustrates a characteristic common of many such motors, i.e., exhibiting a relatively flat peak torque at low speeds which then drops off at higher speeds. As used herein, a motor's "base speed" is defined as the speed at which the torque drops to 95% of the flat peak torque and will continue to drop after the base speed up to the top speed under constant power source limits. Therefore, for curve 703, this knee point occurs at a point 707 on the curve, leading to a base speed of approximately 7200 rpm. As used herein, a motor's "drive system base speed" is equivalent to the motor's base speed after gearing, i.e., the motor base speed divided by the transmission gear ratio. As described above and illustrated in FIGS. 7 and 8, preferably one of the motors (e.g., motor 601) is designed to provide a much higher drive system base speed than the drive system base speed of the other motor (e.g., motor 603). For example, in one embodiment motor 601 is designed to provide at least a 50% higher drive system base speed than the drive system base speed of second motor 603.

The basic configuration illustrated in FIG. 6 provides a number of advantages over a single drive EV. First, the dual motor configuration can be designed to provide superior performance, both in terms of an optimized power curve and overall system efficiency, throughout a larger range of speeds and a larger range of loads (i.e., load torques) which are typical for a high performance vehicle. Second, by splitting the load between two motors, it is easier to keep the motors within the desired operating temperature. Third, the use of two small motors rather than a single, larger motor simplifies vehicle weight distribution. Fourth, a dual motor drive system allows the drive system to be optimized for a variety of different operating conditions, for example by using one motor for continuous light load operation with high efficiency and the other motor to supply high load or high speed supplemental power. Such an approach allows improvements in performance, efficiency, and driving range to be achieved. For example, if a single larger motor drive system were to be utilized to supply the same full load and full power (e.g., during highway hill climbing), its efficiency at light load and low power (e.g., during city cruising, which may require as little as 10% of full load and full power) would be much lower than that of a smaller motor drive system sized for light load and low power operations. Fifth, by coupling the motors to different ESS systems, further improvements may be achieved in terms of weight distribution and cooling efficiency as well as overall optimization of the ESS systems to reduce total weight, size, cost, stresses and aging. Sixth, the dual motor approach may be used to provide drive train redundancy, thus improving vehicle reliability and performance.

Figure 9:
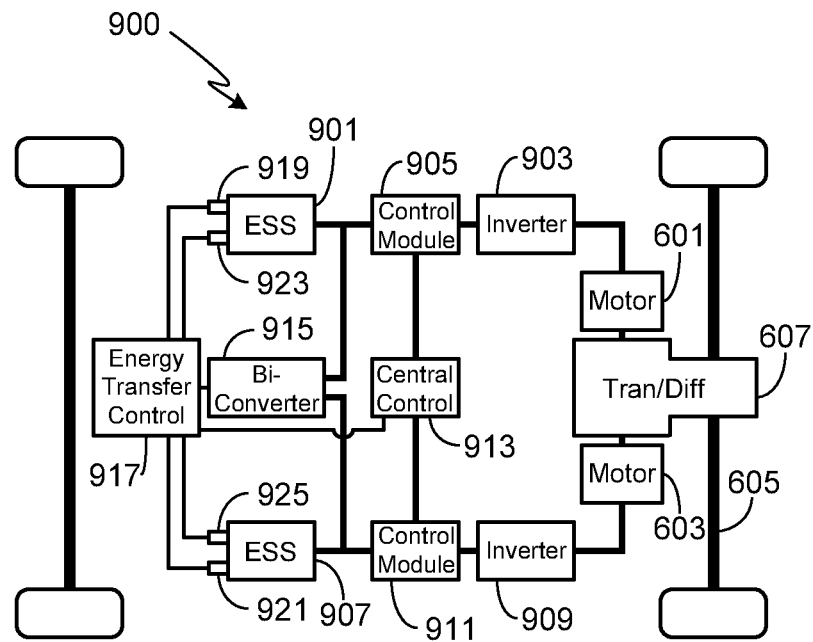
FIG. 9 illustrates the basic elements of a dual electric motor drive system in accordance with a first embodiment of the invention.

FIG. 9 illustrates a first preferred embodiment of the invention that utilizes a pair of ESS systems. As shown, motor 601 is connected to a first ESS 901 via inverter 903 and power control module 905. Power control module 905 is used to insure that the power delivered to motor 601 or the regenerated power recovered from motor 601 has the desired voltage, current, waveform, etc. Similarly, second motor 603 is connected to a second ESS 907 via a second inverter 909 and a second power control module 911. The power control modules may be comprised of passive power devices (e.g., transient filtering capacitors and/or inductors), active power devices (e.g., semiconductor and/or electromechanical switching devices, circuit protection devices, etc.), sensing devices (e.g., voltage, current, and/or power flow sensors, etc.), logic control devices, communication devices, etc. In at least one embodiment, power control modules 905/911 are under the control of a central power control module 913. Preferably each inverter 903/909 includes a DC to AC inverter.

As described above and shown in FIG. 9, each inverter 903/909 is coupled to its own ESS. Using dual ESS systems provides several benefits. First, the two ESS systems can be separately located within the vehicle, thus aiding in weight distribution. Second, each ESS system can have a smaller charge capacity than that which would be required by a single ESS system coupled to two motors. Third, each ESS system can be designed to meet the specific requirements of the motor to which it is coupled, thus potentially allowing differently sized ESS systems to be used, depending upon the requirements of the associated motors. Fourth, the charging and discharging characteristics of the two ESS systems can be designed to be significantly different from one another. For example, the maximum charge and discharge rates of one of the ESS systems may be much higher than those of the other ESS. Preferably in at least one embodiment, the minimum charge rate of the ESS 901 is 3C, where "C" is the full capacity of the ESS divided by 1 hour in accordance with standard conventions.

An important feature of drive system 900 is a bi-directional DC/DC converter 915. DC/DC converter 915 provides a means for transferring energy in either direction between the two drive systems. DC/DC converter 915 is coupled to, and controlled by, an energy transfer control module 917. Energy transfer control module 917 monitors the condition of each ESS system, for example monitoring the state of charge of ESS 901 with sensor 919, and monitoring the state of charge of ESS 907 with sensor 921. In at least one embodiment, energy transfer control module 917 is configured to maintain one or both ESS systems within a preferred state of charge range, i.e., between a lower state of charge and an upper state of charge. For example, energy transfer control module 917 can be configured to maintain one or both ESS systems between a lower limit and an upper limit, where the limits are defined in terms of a percentage of the maximum operating capacity of each respective ESS system. In at least one preferred embodiment, the limits for one or both ESS systems is 50% of the maximum operating capacity for the lower limit and 80% of the maximum operating capacity for the upper limit.

Preferably energy transfer control module 917 also monitors the temperature of ESS 901 with a temperature sensor 923, and monitors the temperature of ESS 907 with a temperature sensor 925. In at least one embodiment, energy transfer control module 917 also monitors central power control module 913, thereby monitoring the requirements being placed on the two drive systems.

As outlined below, bi-directional DC/DC converter 915 provides operational flexibility, and therefore a number of benefits, to various implementations of system 900.

i) Reserve Power—Bi-directional DC/DC converter 915 provides a path and means for one drive system to draw upon the energy resources of the other drive system when additional energy resources are required. As a result, the ESS systems can be designed with smaller charge capacities than would otherwise be required.

For example, under normal operating conditions one of the motors (e.g., motor 601) may only be required to supply a minor amount of torque/power, therefore requiring that ESS 901 have only a relatively minor capacity. However, under conditions when additional torque/power assistance from motor 601 is required, system 900 allows motor 601 to draw from ESS 907 via DC/DC converter 915, power control module 905 and inverter 903. Without converter 915, each ESS system would have to be designed with sufficient energy capacity to handle the expected demands placed on the system during all phases of operation.

ii) ESS Design Flexibility—Due to the inclusion of the bi-directional DC/DC converter 915, the ESS systems can be designed to optimize parameters other than just charge capacity. For example, in at least one embodiment ESS system 901 utilizes a supercapacitor module while ESS system 907 utilizes a conventional battery pack, e.g., one comprised of batteries that utilize lithium-ion or other battery chemistries. Bi-directional DC/DC converter 915 allows system 900 to take advantage of the benefits of each type of energy storage device without being severely impacted by each technology's limitations.

iii) Charging Flexibility—During vehicle operation, preferably regenerative braking is used to generate power that can be used to charge either, or both, ESS systems 901 and 907. In system 900, bi-directional DC/DC converter 915 allows the electrical power generated by either, or both, drive systems to be used to charge either, or both, ESS systems. As a result, the state of charge of both systems can be optimized relative to the available power.

Although preferably both drive systems are used to generate power, in at least one configuration only one of the drive systems is used to generate electrical power via regenerative braking as well as provide drive power. In such a configuration, bi-directional DC/DC converter 915 allows the power generated by the single drive system during the regenerative braking cycle to be used to charge both ESS systems as required.

In addition, in a system such as that shown in FIG. 9, the two ESS systems can utilize different charging profiles based on, and optimized for, their individual designs. For example, one of the ESS systems may be configured to accept a fast charging profile. Since the two ESS systems are isolated, except for the bi-directional DC/DC converter 915, the fast charging ESS system is not adversely affected by the slowing down effect of the other ESS system.

iv) Independent ESS/Drive System Design/Implementation—The inclusion of the bi-directional DC/DC converter 915 provides additional flexibility in the design and optimization of the drive systems associated with each ESS system, for example allowing drive motors with different nominal voltage levels to be used.

Figure 10:
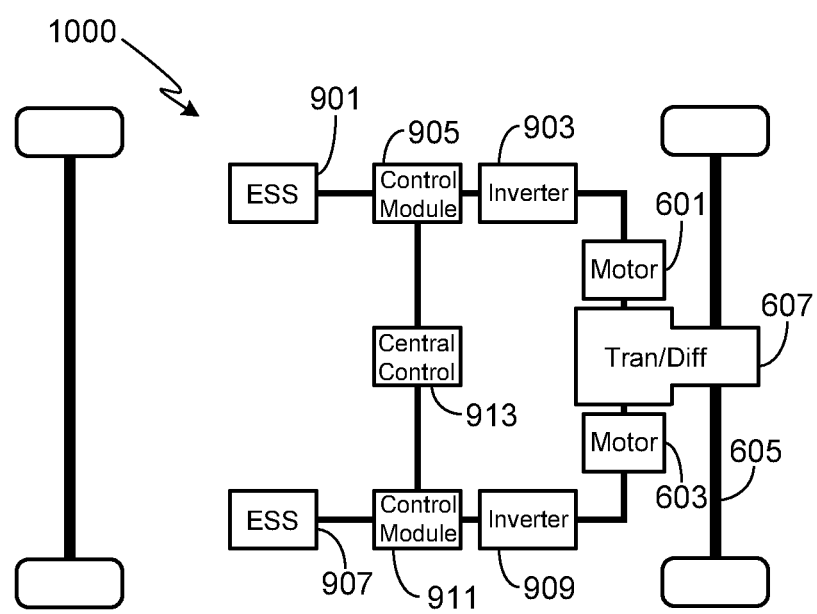
FIG. 10 illustrates the basic elements of a dual electric motor drive system in accordance with a second embodiment of the invention.

FIG. 10 illustrates a second preferred embodiment of the invention. As shown, system 1000 is the same as system 900 except for the elimination of bi-directional DC/DC converter 915 and associated hardware. Eliminating the DC/DC converter effectively separates the electrical power aspects of the two drive systems. As a result, ESS systems 901 and 907 are designed to meet the expected needs of motors 601 and 603, respectively.

Figure 11:
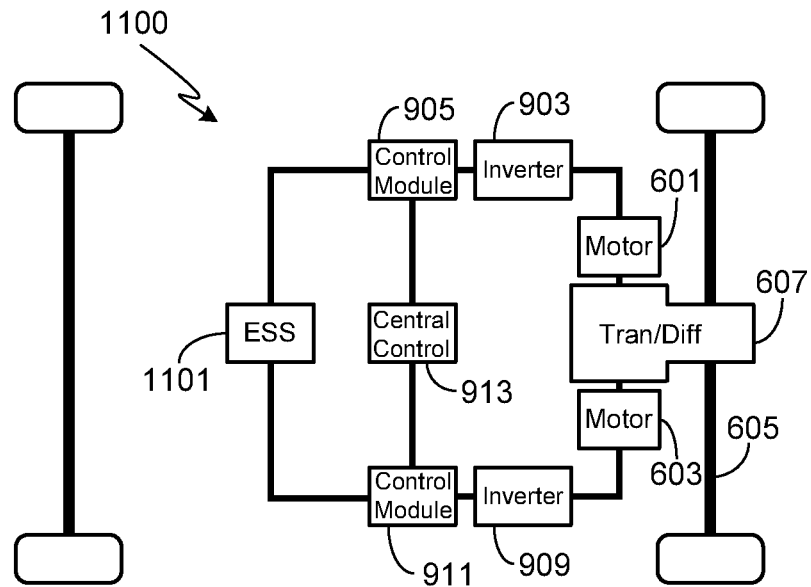
FIG. 11 illustrates the basic elements of a dual electric motor drive system in accordance with a third embodiment of the invention.

FIG. 11 illustrates a third preferred embodiment of the invention utilizing a single ESS 1101 as in system 600 shown in FIG. 6. This illustration provides additional detail, specifically inverters 903/909, power control modules 905/911, and central power control module 913. Clearly in this embodiment the ESS system must have sufficient capacity to meet the expected needs of both motors 601 and 603.

Figure 12:
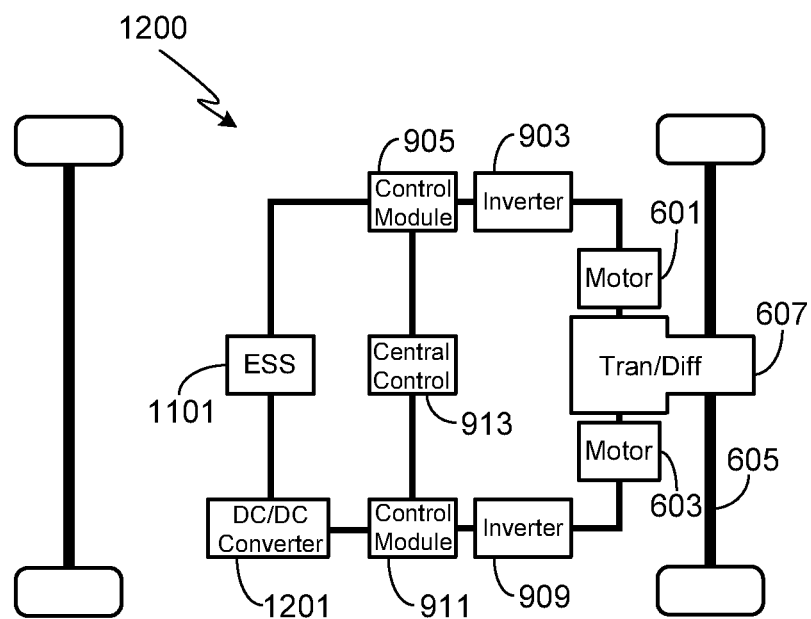
FIG. 12 illustrates the basic elements of a dual electric motor drive system in accordance with a fourth embodiment of the invention.

FIG. 12 illustrates a fourth preferred embodiment of the invention. As shown, system 1200 is the same as system 1100 except for the addition of a DC/DC converter 1201 between ESS system 1101 and power control module 911/inverter 909. DC/DC converter 1201 allows motor 601 to have a DC bus nominal voltage range that is different from that of motor 603. It will be appreciated that a DC/DC converter could also be interposed between ESS 1101 and power control module 905/inverter 903, rather than between ESS 1101 and power control module 911/inverter 909 as shown.

Figure 13:
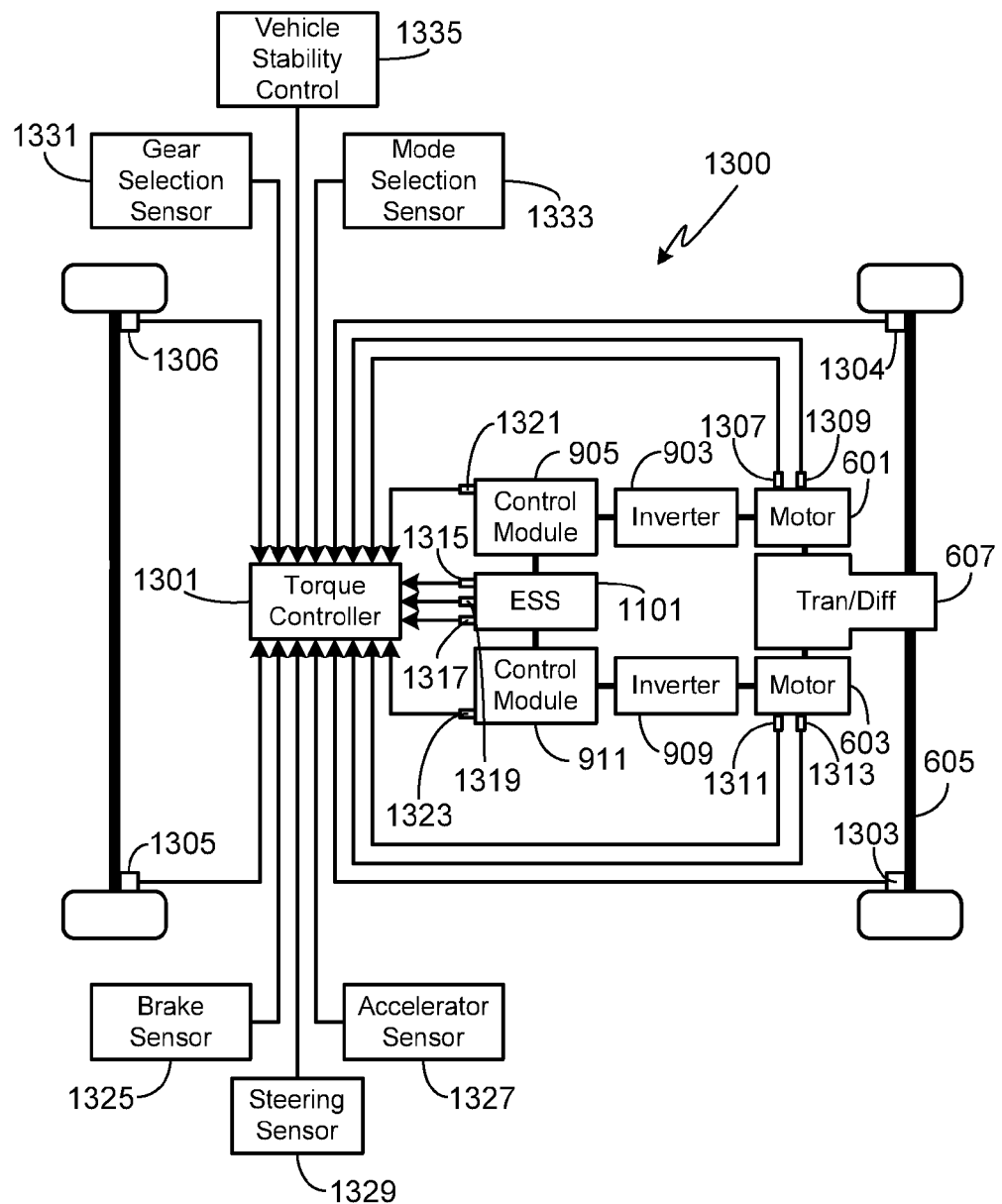
FIG. 13 illustrates the basic elements of a torque control system for use with a dual electric motor drive system such as that shown in FIG. 11.

As described below in further detail, another aspect of the invention that is applicable to the dual drive system, regardless of ESS configuration, is a torque control system. This aspect is illustrated in FIG. 13 for a single ESS system such as that shown in FIG. 11. As shown and as previously described, motor 601 is connected to ESS 1101 via DC to AC inverter 903 and power control module 905. Similarly, motor 603 is connected to ESS 1101 via DC to AC inverter 909 and power control module 911. The power control modules 905/911 are used to insure that the power delivered to motors 601/603 or the regenerated power recovered from motors 601/603 have the desired voltage, current, waveform, etc.

As previously noted, although FIG. 13 shows a single ESS, other ESS configurations such as those described above (e.g., dual ESS configurations) may also be used with the torque controller described herein.

In accordance with the invention, system 1300 includes a torque controller 1301 that determines the power, i.e., voltage, current, and waveform, that each of the power control modules 905/911 supplies to their respective motors, and thus the torque and power that each motor applies to axle 605. In order to calculate the appropriate power to be supplied to each motor, torque controller 1301 is coupled to, and receives data from, a variety of sensors throughout the vehicle. In general, these sensors can be divided into four groups; those used to monitor vehicle performance, those used to monitor the drive system, those used to monitor the condition and performance of the ESS(s) and the power control electronics, and those used to monitor user input. A description of exemplary sensors for each group of sensors follows.

Vehicle Performance Sensors—The sensors within this group monitor the on-going performance of the vehicle by monitoring wheel spin, and thus tire slippage, using one or more wheel spin sensors. In the illustrated embodiment, a wheel spin sensor is coupled to each wheel of each axle, i.e., sensors 1303-1306. The system may also include a vehicle stability control system 1335 that detects vehicle spinning and then selectively controls the vehicle's brake system in order to minimize such spinning. Vehicle stability control system 1335 may also control the torque of motor 601 and/or motor 603 during such an event via a stability torque request, thereby further enhancing vehicle control.

Drive System Sensors—The sensors within this group monitor the performance of the two motors. Preferably coupled to motor 601 is a temperature sensor 1307 and a motor speed sensor 1309, and coupled to motor 603 is a temperature sensor 1311 and a motor speed sensor 1313.

ESS and Power Control Electronics Sensors—The sensors within this group monitor the condition of the ESS and power control modules. Preferably coupled to ESS 1101 is a temperature sensor 1315, a voltage sensor 1317 and a current sensor 1319. Preferably coupled to power control module 905 is a temperature sensor 1321. Preferably coupled to power control module 911 is a temperature sensor 1323.

User Input Sensors—The sensors within this group monitor user input. Exemplary sensors in this group include a brake sensor 1325, an accelerator sensor 1327, and a steering sensor 1329. These sensors can be coupled to the corresponding pedals and/or steering wheel, coupled to the corresponding linkage, or otherwise coupled to the vehicle drive systems such that braking, accelerator and steering data is obtained. The system may also include a gear selection sensor 1331 if the vehicle includes a multi-gear transmission, as opposed to a single speed transmission. The system may also include a mode selection sensor 1333 if the vehicle allows the user to select from multiple operating modes, e.g., high efficiency mode, high performance mode, etc.

Although the primary sensors used by torque controller 1301 are shown in FIG. 13 and described above, it will be appreciated that the invention can use other sensors to provide additional information that can be used to determine the optimal torque split between the two motors. For example, by monitoring vehicle incline, the system can adapt for steep hill climbing or descending conditions.

Figure 14:
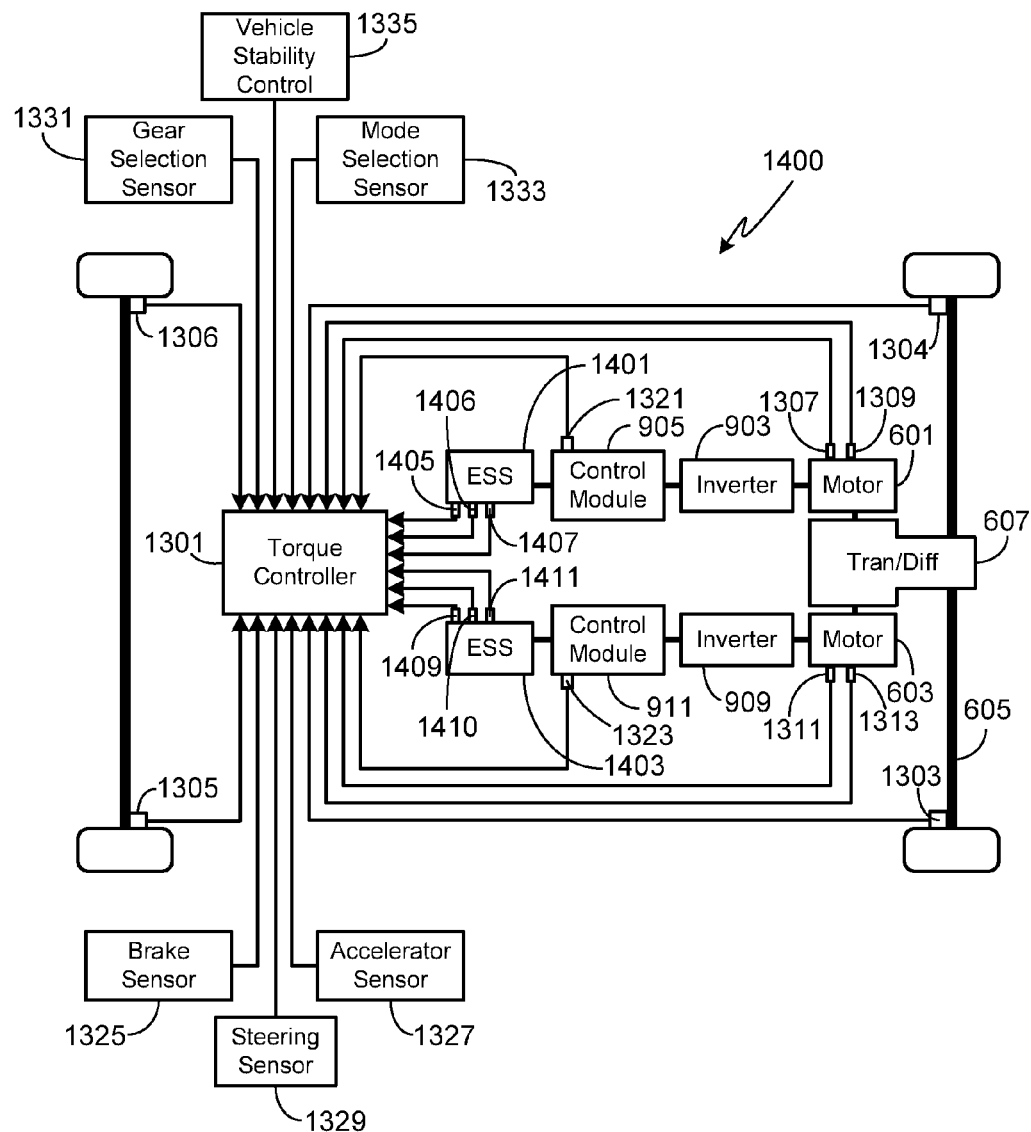
FIG. 14 illustrates the basic elements of a torque control system for a dual electric motor drive system similar to that shown in FIG. 13, with the exception that each motor/power control module is coupled to a separate ESS.

As previously noted, the present invention is not limited to vehicle systems in which both motors are coupled to a single ESS. For example, FIG. 14 illustrates a torque control system similar to that shown in FIG. 13, with the exception that each motor/power control module is coupled to a separate ESS. Specifically, motor 601 and power control module 905 are coupled to ESS 1401 while motor 603 and power control module 911 are coupled to ESS 1403. In this embodiment ESS 1401 includes temperature, voltage and current sensors 1405-1407, respectively, and ESS 1403 includes temperature, voltage and current sensors 1409-1411, respectively. If desired, ESS 1401 can be coupled to ESS 1403, for example using a bi-directional DC/DC converter (not shown) as described in detail above.

Figure 15:
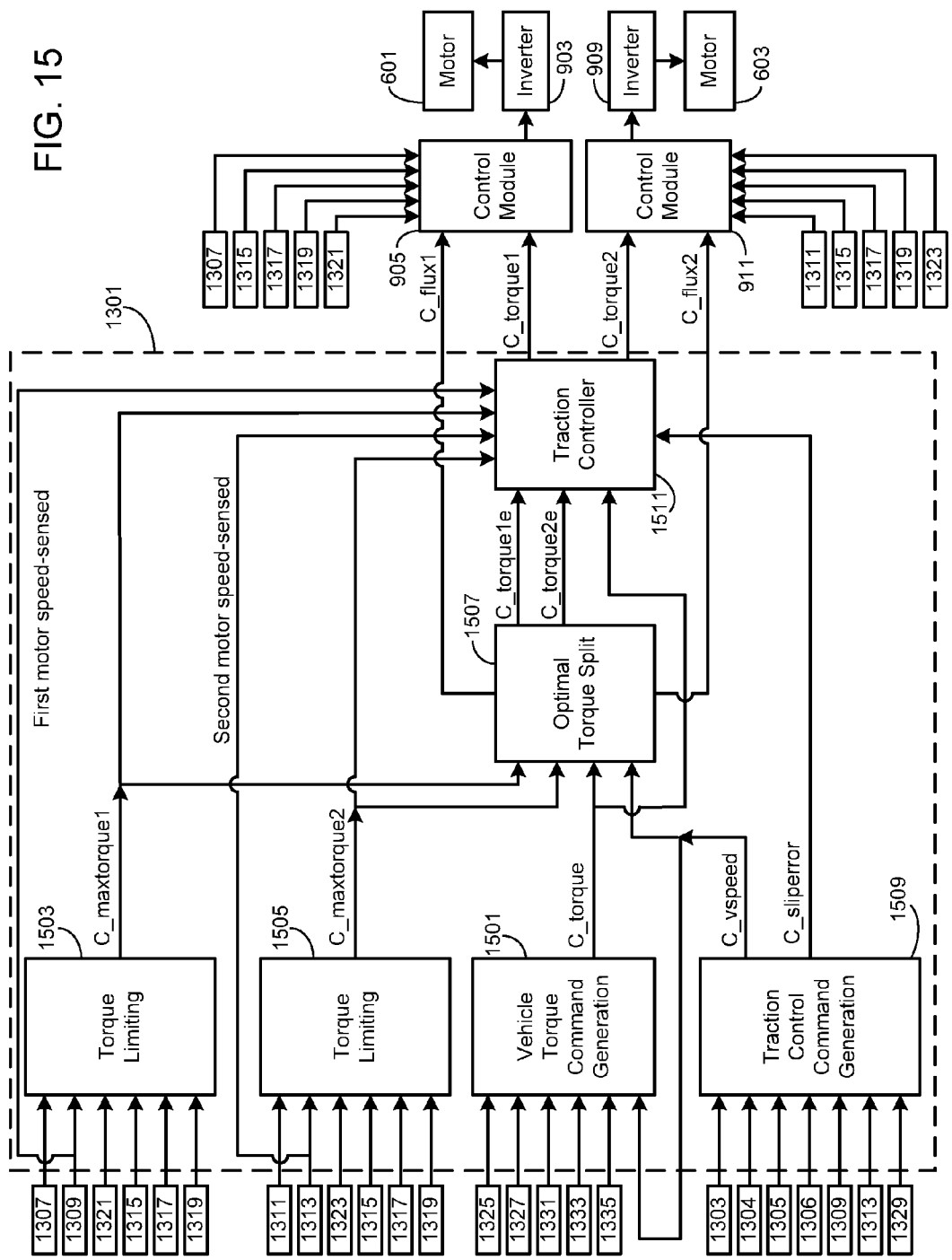
FIG. 15 illustrates the basic elements of the torque controller shown in FIG. 13.

FIG. 15 provides a more detailed schematic of torque controller 1301. As shown, data from the brake sensor 1325, accelerator sensor 1327, gear selection sensor 1331 (if the vehicle has multiple gears), mode selection sensor 1333 (if the vehicle includes multiple modes) and vehicle stability control system 1335 (if the vehicle includes a stability control system) are input into the vehicle torque command generation unit 1501. The computed vehicle speed, referred to herein as "C_vspeed", is also input into the vehicle torque command generation unit 1501. C_vspeed is computed by the traction command generation unit 1509. The output of unit 1501 is a total torque requirement request, referred to herein as "C_torque". C_torque is the torque required from the combined motors.

The maximum torque available from the two motors, referred to herein as "C_maxtorque1" and "C_maxtorque2", are calculated by the first torque limiting unit 1503 and the second torque limiting unit 1505, respectively. The inputs to the first torque limiting unit 1503 are the data from first motor temperature sensor 1307, first motor speed sensor 1309, and first power control module temperature sensor 1321. The inputs to the second torque limiting unit 1505 are the data from second motor temperature sensor 1311, second motor speed sensor 1313, and second power control module temperature sensor 1323. Assuming a single ESS configuration, for example as shown in FIG. 13, ESS data input to both units 1503 and 1505 are the ESS temperature data from sensor 1315 as well as the ESS voltage and current data from sensors 1317 and 1319, respectively. If each motor is coupled to its own ESS as illustrated in FIGS. 9 and 10, then the ESS data input into unit 1503 is from the ESS coupled to motor 601 and the ESS data input into unit 1505 is from the ESS coupled to motor 603.

The torque required from the combined motors calculated by unit 1501, and the maximum available torque for the first and second motors, calculated by units 1503 and 1505 respectively, are input into the optimal torque split unit 1507 as is the computed vehicle speed. Unit 1507 optimizes the torque split between the two motors without taking into account wheel slip, thus splitting the desired combined torque, i.e., C_torque, into an optimal first motor torque request and an optimal second motor torque request, the split based solely on achieving maximum operating efficiency within the limits of the available torque for each motor.

Figure 16:
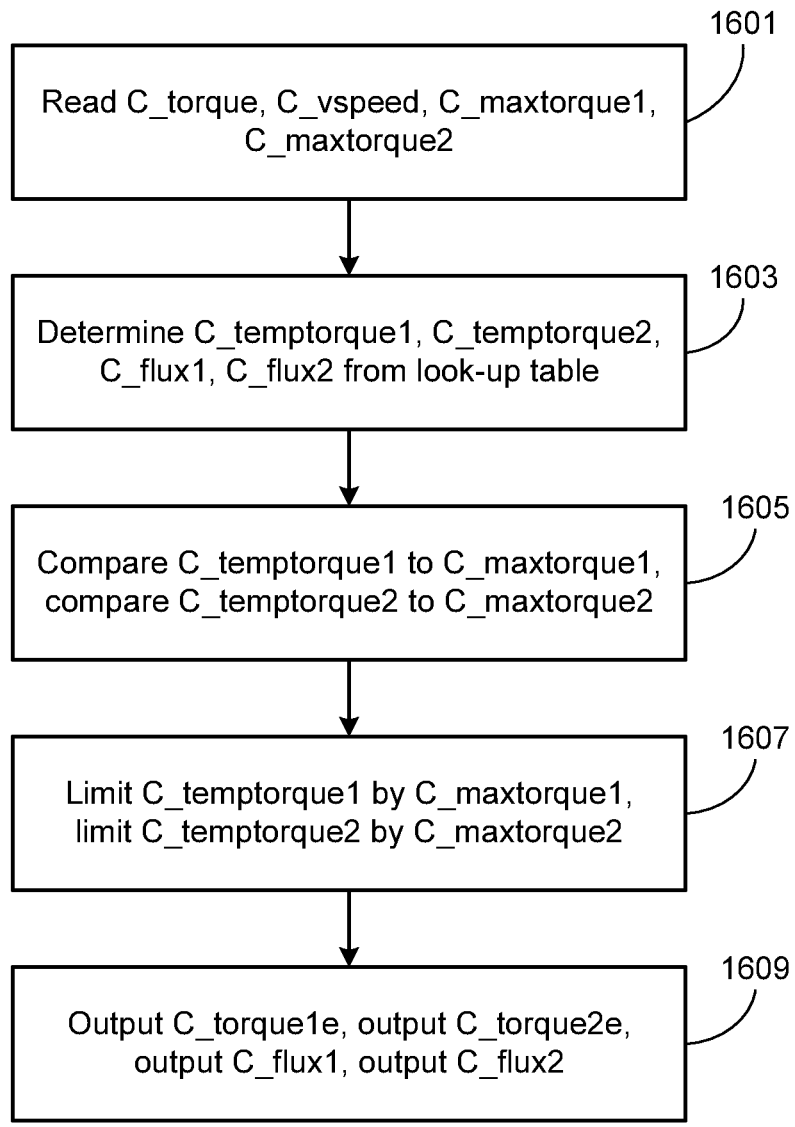
FIG. 16 illustrates the algorithm used to calculate the optimal torque split between the two motors, without taking into account wheel slip errors.

The system of the invention uses a simple continuously running algorithm to determine the optimal torque split, as illustrated in FIG. 16. As shown, initially C_torque, C_vspeed, C_maxtorque1 and C_maxtorque2 are read (step 1601). Next, temporary values for the torque for the first motor 601 (C_temptorque1) and for the second motor 603 (C_temptorque2) are determined, as well as values for the motor flux for first motor 601 (C_flux1) and for second motor 603 (C_flux2). (Step 1603). This step is performed by interpolating data from a look-up table, described in further detail below, that contains optimal torque (i.e., T1 and T2) and optimal flux values (i.e., F1opt and F2opt) based on vehicle speed and total requested torque. The temporary torque values set in step 1603, based on the look-up table, are then compared to the maximum available torque values (step 1605) calculated by torque limiting units 1503 and 1505. If the temporary torque values are less than the maximum available torque values, then the temporary torque values are output as C_torque1e (first motor) and C_torque2e (second motor); if the temporary torque values are greater than the maximum available torque values, then the maximum available torque values are output as C_torque1e and C_torque2e. (Steps 1607 and 1609). The flux command values for the first motor, i.e., C_flux1, and the second motor, i.e., C_flux2, are also output in step 1609.

Figure 17:
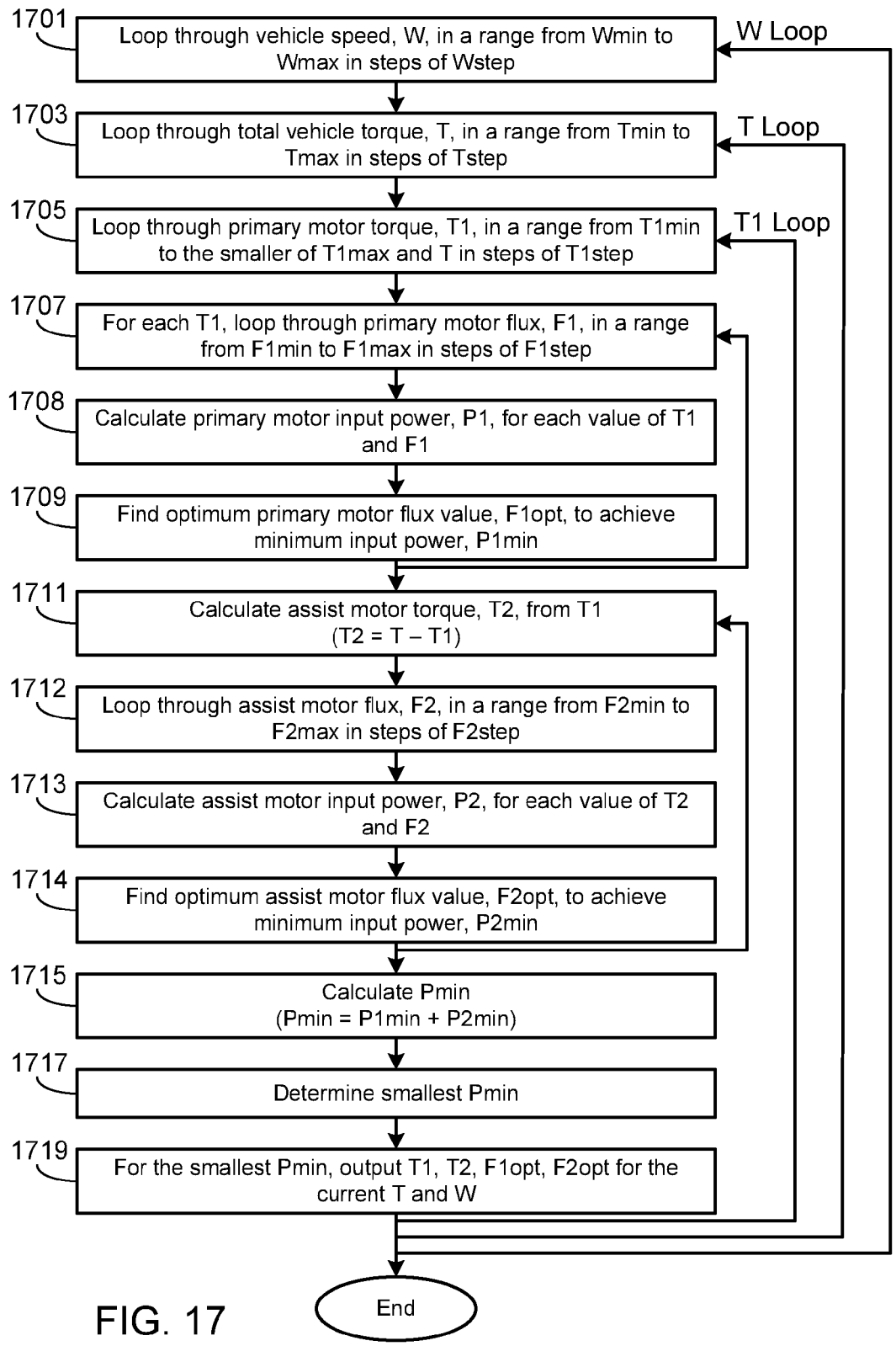
FIG. 17 illustrates the algorithm used to generate the look-up table utilized by the optimal torque split unit.

FIG. 17 illustrates the preferred algorithm used to generate the three-dimensional look-up table utilized by the optimal torque split unit 1507. In step 1701, a first loop is initiated in which vehicle speed, W, is stepped through from a minimum value, Wmin, to a maximum value, Wmax, in steps of Wstep. In step 1703, a second loop is initiated in which total vehicle torque, T, is stepped through from a minimum value, Tmin, to a maximum value, $T_{max}$, in steps of Tstep. In step 1705, a third loop is initiated in which the torque of the first motor, T1, is stepped through from a minimum value, T1min, to a maximum value in steps of T1step. The maximum value in step 1705 is the smaller of T1max and T.

In the next series of steps, steps 1707-1709, the optimum flux value, F1opt, for the first motor 601 is determined for each value of T1. Initially, for a given value of T1 the first motor flux F1 is stepped through from a minimum value, F1min, to a maximum value, F1max, in steps of F1step. Then for each value of T1 and F1, a value for first motor input power, P1, is calculated. Next, F1opt is determined, based on achieving the minimum input power, P1min.

In the next series of steps, steps 1711-1714, the optimum flux value, F2opt, for the second motor 603 is determined for each value of T1. Initially for a given value of T1, the corresponding value for the torque of the second motor, T2, is determined, where T2 is equal to T minus T1. Then the second motor flux F2 is stepped through from a minimum value, F2 min, to a maximum value, F2max, in steps of F2step. Next, the value for the second motor input power, P2, is calculated for each value of T2 and F2. Lastly, F2opt is determined, based on achieving the minimum input power, P2 min.

In step 1715 a minimum total motor input power, Pmin, is calculated, where Pmin is equal to P1min plus P2 min. Next, the smallest Pmin is found for the value of T1 for this particular iteration of the T1 loop. (Step 1717) Lastly, for the smallest Pmin and the current T and W, values for T1, T2, F1 opt and F2opt are output. (Step 1719)

The traction control command generation unit 1509 provides several functions. As input, data from each wheel spin sensor, e.g., sensors 1303-1306, is fed into unit 1509. Additionally, data from first motor speed sensor 1309, second motor speed sensor 1313, and steering sensor 1329 are input into the traction control command generation unit. Using this data, unit 1509 calculates vehicle speed, C_vspeed, which is input into the vehicle torque command generation unit 1501 as previously noted. Unit 1509 also uses the motor speed data to provide error checking.

A primary function of unit 1509 is to calculate wheel slip ratios, the wheel slip ratio being the difference between the wheel speed and the vehicle speed, divided by the greater of the wheel speed and the vehicle speed. After calculating the wheel slip ratio as a function of vehicle speed, a wheel slip ratio is calculated. The wheel slip ratio must take into account that wheels 609 and 611 of axle 605 may experience different degrees of slip, and thus exhibit different slip ratios. For a limited slip differential, and in most other cases as well, preferably the higher of the two wheel slip ratios is taken as the wheel slip ratio for that axle.

In order to determine if the wheel slip ratio is greater than desired, the wheel slip ratio must be compared to a target wheel slip ratio contained within a lookup table. The lookup table provides target wheel slip ratios as a function of speed and steering angle. The lookup table can be based on well known target ratios or, as is preferred, based on test data obtained for that particular vehicle and vehicle configuration. The difference between the computed wheel slip ratio and the target wheel slip ratio yields the computed slip error, referred to herein as "C_sliperror". To prevent control chatter, preferably hysteresis is incorporated into the comparator used in this calculation by means of a dead band, i.e., neutral zone. In addition to controlling chatter, the hysteresis band also allows for a small amount of additional wheel slippage, which may compensate for vehicle weight dynamic distribution and improve acceleration and deceleration performance.

Figure 18:
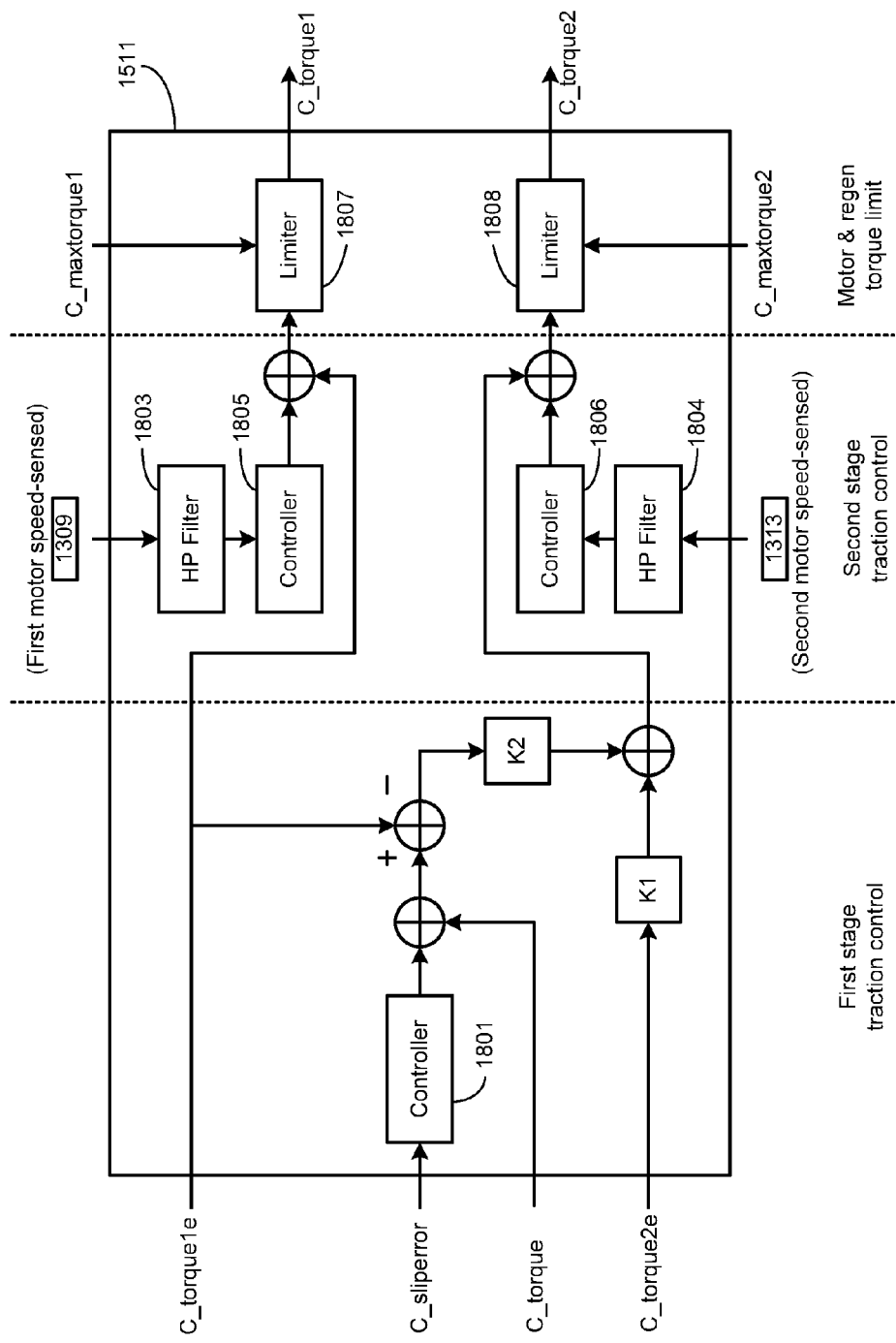
FIG. 18 illustrates a block diagram of the traction control unit shown in FIG. 15.

The computed slip error, C_sliperror, along with the values for the optimized torque split, C_torque1e and C_torque2e, and the total requested torque, C_torque, are input into the first stage of the traction control unit 1511. Details of unit 1511 are shown in FIG. 18. As shown, the first stage independently minimizes the wheel slip ratio error using a feedback control system, for example using a lead-lag controller, sliding-mode controller, PID controller or other linear or non-linear controller type. Preferably a PID controller is used for the compensator 1801 in the first stage feedback control system. In the second stage of unit 1511, motor speed fast disturbances are independently minimized using high pass filters 1803/1804 and compensators (preferably PID controllers) 1805/1806. Motor speed fast disturbances can be caused, for example, by sudden large reductions of load torque on the motor shaft during an excessive wheel slip event, or by sudden large additions of load torque on the motor shaft from a stuck wheel.

Note that in this embodiment, the first stage traction control further includes a transient torque hybrid feedforward and feedback control circuit that during vehicle transient operations modifies the amount of torque to the drive axle and modifies the otherwise efficiency optimizing torque request to one of the two motors, through a feedforward controller block K1 and a feedback controller block K2. The amount of feedback torque modification is the result of the controller K2 responding to the difference between the driver torque request after the slip error minimizing controller 1801 and the first motor torque command, C_torque-C_torque1e. The feedforward controller block K1 is designed to behave like a low pass unity-gain filter, while the feedback controller block K2 is designed to behave like a high pass filter with zero low frequency gain. The feedback torque component through controller K2 is zero when the torque request is fully met, with a zero effective wheel slip ratio error and with the maximum torque limits not in effect. The hybrid feedforward and feedback control enhances the vehicle performance, vehicle response to driver request and drivability without compromising traction control. In addition to having different power and efficiency characteristics for improved total system steady-state performance, the two motor drive systems can be designed to have different dynamic response characteristics for improved total system dynamic performance.

After the second stage of traction control, torque limiters 1807/1808 independently limit the torque commands issuing from the second stage based on C_maxtorque1 and C_maxtorque2. The output of the torque limiters 1807/1808 are torque commands C_torque1 and C_torque2. The torque commands from the limiters and the flux commands, C_flux1 and C_flux2, from the optimal torque split unit 1507 are input into control modules 905 and 911 as shown in FIG. 15. Power control modules 905 and 911 can use any of a variety of motor control techniques, e.g., scalar control, vector control, and direct torque control. Vector control allows fast and decoupled control of torque and flux. In at least one preferred embodiment of the invention, the control modules utilize a pulse width modulator (PWM) control circuit.

In some instances the torque and flux motor control commands may be subject to further limitation, specifically due to component overheating and/or ESS power limitations. Such command limits may be applied by an additional limiter circuit within the torque controller 1301, or within the power control modules as illustrated in FIG. 15. In general, such limiters monitor the temperatures of the motors via sensors 1307/1311, the temperatures of the power electronics via sensors 1321/1323, and the temperature, voltage and current of ESS 1101 via sensors 1315/1317/1319. If multiple ESS systems are used, as previously described, then the temperature, voltage and current of each ESS system are taken as inputs to the limiters. In at least one embodiment using a single ESS system, if the ESS temperature is above a threshold temperature, then the commands to the motors are proportionally reduced. If the temperature of a particular power control module or a particular motor is above its preset temperature threshold, then the control commands sent to that particular motor are reduced. Preferably in such an instance the control commands sent to the non-affected motor are sufficiently increased to insure that the total requested torque, C_torque, is met. The limiters may rely on a look-up table that provides preset command reductions as a function of the amount that a monitored temperature is above its respective preset temperature threshold.

In accordance with at least one preferred embodiment, the torque and traction controller 1301 uses multiple processing frequencies, the specific frequency depending upon the function of the unit in question. For example, a dual frequency approach can be used in which a relatively low frequency is applied in order to optimize the performance of the two motors based on general operating conditions, while a second, higher frequency is applied in order to quickly respond to rapidly developing transient conditions, e.g., wheel slippage. In this preferred approach, low frequency cycling is applied to the torque command generation unit 1501, the torque limiting units 1503/1505, the optimal torque split unit 1507 and the various temperature, voltage, current, and speed sensors. Preferably the low frequency is selected to be within the range of 100 Hz to 2 kHz, more preferably in the range of 500 Hz to 1.5 kHz, and even more preferably set at approximately 1 kHz. High frequency cycling is applied to the traction control unit 1511, control modules 905/911 and the wheel slip sensors, and is preferably at a frequency of about 10 to 30 times that of the low frequency, and more preferably at a frequency of approximately 20 kHz. As the traction control command generation unit 1509 monitors wheel slippage and generates the slip errors for each axle, preferably it operates at the high cycle frequency although in at least one embodiment, it operates at an intermediate rate, e.g., 5-10 kHz.

Figure 19:
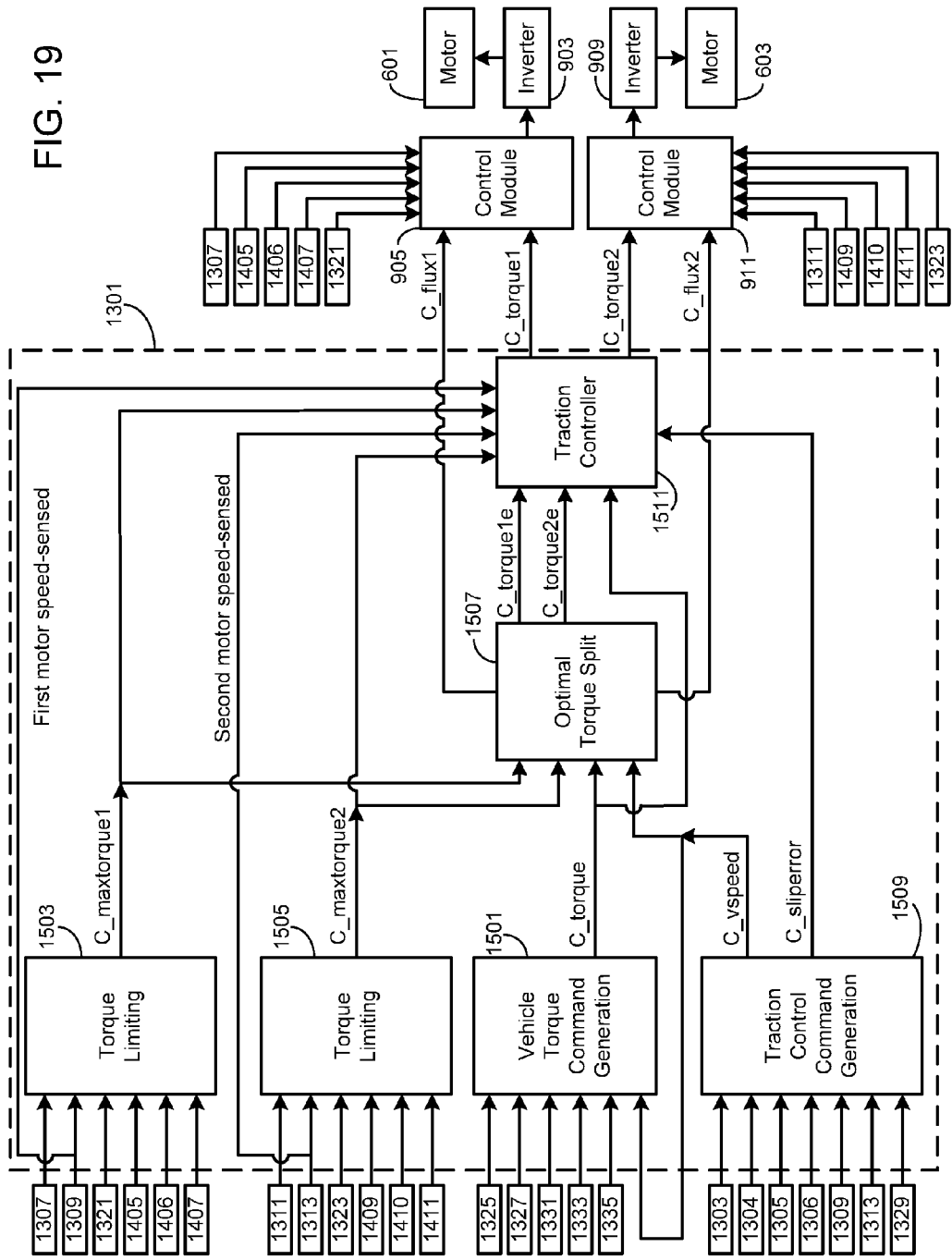
FIG. 19 illustrates the basic elements of the torque controller shown in FIG. 14.

As previously noted, the present control system can be used with an EV that utilizes a single ESS for both motors, or one which utilizes an ESS per motor. The system and methodology is basically the same as previously described in detail, except that the temperature, current and voltage of each ESS must be monitored and taken into account. Thus, for example, the control system shown in FIG. 15 would be modified as shown in FIG. 19. Specifically, the temperature, current and voltage of the first ESS 1401 would be sensed with sensors 1405-1407 and input into the first torque limiting unit 1503 and the first control module 905; and the temperature, current and voltage of the second ESS 1403 would be sensed with sensors 1409-1411 and input into the second torque limiting unit 1505 and the second control module 911.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A method of operating an electric vehicle, the electric vehicle having a first electric motor coupled to a vehicle drive axle and a second electric motor coupled to said vehicle drive axle, the method comprising the steps of:
   a) monitoring a wheel speed sensor corresponding to said vehicle drive axle, a first motor speed sensor and a second motor speed sensor, and computing a vehicle speed corresponding to said electric vehicle based on output from said wheel speed sensor, said first motor speed sensor and said second motor speed sensor, wherein said vehicle speed computing step is performed by a traction control command generation unit;
   b) monitoring a brake sensor and an accelerator sensor, and computing a total torque requirement request based on output from said brake sensor and said accelerator sensor and said vehicle speed, wherein said total torque requirement request computing step is performed by a vehicle torque command generation unit;
   c) splitting said total torque requirement request into an optimal first motor torque request and an optimal second motor torque request, wherein said total torque requirement request splitting step is performed by an optimal torque splitting unit;
   d) inputting a wheel target slip ratio and computing a slip error corresponding to said vehicle drive axle based on output from said wheel speed sensor and said vehicle speed and said wheel target slip ratio, wherein said first slip error computing step is performed by said traction control command generation unit;
   e) minimizing said slip error using a feedback control system implemented by a traction control unit, said traction control unit further performing the steps of transforming said optimal first motor torque request into a first motor torque command and transforming said optimal second motor torque request into a second motor torque command based on said step of minimizing said slip error;
   f) controlling said first electric motor based on said first motor torque command;
   g) controlling said second electric motor based on said second motor torque command; and
   h) repeating steps a)-g) throughout operation of said electric vehicle.

2. The method of claim 1, further comprising the step of monitoring a steering sensor, wherein said step of computing said vehicle speed is based on output from said wheel speed sensor, said first motor speed sensor, said second motor speed sensor, and said steering sensor.

3. The method of claim 1, wherein said total torque requirement request splitting step further comprises the step of interpolating data from a look-up table, said look-up table containing said optimal first motor torque request and said optimal second motor torque request as a function of said vehicle speed and said total torque requirement request.

4. The method of claim 1, step c) further comprising the steps of:
   monitoring a first motor temperature sensor;
   computing a first motor maximum available torque based on output from said first motor speed sensor and said first motor temperature sensor;
   limiting said optimal first motor torque request by said first motor maximum available torque;
   monitoring a second motor temperature sensor;
   computing a second motor maximum available torque based on output from said second motor speed sensor and said second motor temperature sensor; and
   limiting said optimal second motor torque request by said second motor maximum available torque.

5. The method of claim 4, further comprising the steps of:
   monitoring a first power control module temperature sensor, said first power control module temperature sensor in thermal communication with a first power control module, said first power control module electrically connected to said first motor, wherein said first motor maximum available torque computing step is further based on output from said first power control module temperature sensor; and monitoring a second power control module temperature sensor, said second power control module temperature sensor in thermal communication with a second power control module, said second power control module electrically connected to said second motor, wherein said second motor maximum available torque computing step is further based on output from said second power control module temperature sensor.

6. The method of claim 4, further comprising the steps of:
monitoring a first energy storage system (ESS) temperature sensor, said first ESS temperature sensor in thermal communication with a first ESS, said first ESS electrically connected to a first power control module, said first power control module electrically connected to said first motor;

monitoring a first ESS voltage sensor;

monitoring a first ESS current sensor, wherein said first motor maximum available torque computing step is further based on output from said first ESS temperature sensor, said first ESS voltage sensor and said first ESS current sensor;

monitoring a second ESS temperature sensor, said second ESS temperature sensor in thermal communication with a second ESS, said second ESS electrically connected to a second power control module, said second power control module electrically connected to said second motor;

monitoring a second ESS voltage sensor; and monitoring a second ESS current sensor, wherein said second motor maximum available torque computing step is further based on output from said second ESS temperature sensor, said second ESS voltage sensor and said second ESS current sensor.

7. The method of claim 4, further comprising the steps of:
monitoring an energy storage system (ESS) temperature sensor, said ESS temperature sensor in thermal communication with an ESS, said ESS electrically connected to a first power control module and to a second power control module, said first power control module electrically connected to said first motor, said second power control module electrically connected to said second motor;

monitoring an ESS voltage sensor; and monitoring an ESS current sensor, wherein said first motor maximum available torque computing step and said second motor maximum available torque computing step are further based on output from said ESS temperature sensor, said ESS voltage sensor and said ESS current sensor.

8. The method of claim 1, further comprising the steps of minimizing first motor speed fast disturbances and second motor speed fast disturbances using a second feedback control system implemented by said traction control unit, wherein said steps of transforming said optimal first motor torque request into said first motor torque command and transforming said optimal second motor torque request into said second motor torque command are based on said step of minimizing said slip error and based on said step of minimizing said first motor speed fast disturbances and second motor speed fast disturbances.

9. The method of claim 1, step e) further comprising the steps of:

monitoring a first motor temperature sensor;

computing a first motor maximum available torque based on output from said first motor speed sensor and said first motor temperature sensor;

limiting said first motor torque command by said first motor maximum available torque;

monitoring a second motor temperature sensor;

computing a second motor maximum available torque based on output from said second motor speed sensor and said second motor temperature sensor; and limiting said second motor torque command by said second motor maximum available torque.

10. The method of claim 9, further comprising the steps of:
monitoring a first power control module temperature sensor, said first power control module temperature sensor in thermal communication with a first power control module, said primary power control module electrically connected to said first motor, wherein said first motor maximum available torque computing step is further based on output from said first power control module temperature sensor; and monitoring a second power control module temperature sensor, said second power control module temperature sensor in thermal communication with a second power control module, said second power control module electrically connected to said second motor, wherein said second motor maximum available torque computing step is further based on output from said second power control module temperature sensor.

11. The method of claim 9, further comprising the steps of:
monitoring a first energy storage system (ESS) temperature sensor, said first ESS temperature sensor in thermal communication with a first ESS, said first ESS electrically connected to a first power control module, said first power control module electrically connected to said first motor;

monitoring a first ESS voltage sensor;

monitoring a first ESS current sensor, wherein said first motor maximum available torque computing step is further based on output from said first ESS temperature sensor, said first ESS voltage sensor and said first ESS current sensor;

monitoring a second ESS temperature sensor, said second ESS temperature sensor in thermal communication with a second ESS, said second ESS electrically connected to a second power control module, said second power control module electrically connected to said second motor;

monitoring a second ESS voltage sensor; and monitoring a second ESS current sensor, wherein said second motor maximum available torque computing step is further based on output from said second ESS temperature sensor, said second ESS voltage sensor and said second ESS current sensor.

12. The method of claim 9, further comprising the steps of:
monitoring an energy storage system (ESS) temperature sensor, said ESS temperature sensor in thermal communication with an ESS, said ESS electrically connected to a first power control module and to a second power control module, said first power control module electrically connected to said first motor, said second power control module electrically connected to said second motor;

monitoring an ESS voltage sensor; and monitoring an ESS current sensor, wherein said first motor maximum available torque computing step and said second motor maximum available torque computing step are further based on output from said ESS temperature sensor, said ESS voltage sensor and said ESS current sensor.

13. The method of claim 1, wherein steps a) through d) are repeated at a first frequency and steps e) through g) are repeated at a second frequency, wherein said second frequency is between 10 and 30 times said first frequency.

14. The method of claim 1, wherein steps b) and c) are repeated at a first frequency, steps e) through g) are repeated at a second frequency between 10 and 30 times said first frequency, and wherein steps a) and d) are repeated at a third frequency, said third frequency between said first and second frequencies.

15. The method of claim 1, further comprising the step of computing an optimal first motor flux command and an optimal second motor flux command, wherein said step of computing said optimal first motor flux command and said optimal second motor flux command further comprises the step of interpolating data from a look-up table, said look-up table containing said optimal first motor flux command and said optimal second motor flux command as a function of said vehicle speed and said total torque requirement request.

* * * * *